United States Patent [19]

Asahara et al.

[11] Patent Number: 5,475,595
[45] Date of Patent: Dec. 12, 1995

[54] SPEED STAGE SHIFTING OF AUTOMATIC TRANSMISSION BY COMPOSITE CONTROL PHASES EMPLOYING COMMON TARGET PARAMETER

[75] Inventors: Norimi Asahara, Aichi; Yasuo Hojo, Nagoya; Hideaki Ootsubo, Toyota, all of Japan

[73] Assignee: Toyota Jidosha Kabushiki Kaisha, Toyota, Japan

[21] Appl. No.: 257,582

[22] Filed: Jun. 9, 1994

Related U.S. Application Data

[63] Continuation of Ser. No. 948,415, Sep. 22, 1992, abandoned.

[30] Foreign Application Priority Data

Oct. 9, 1991 [JP] Japan ..................... 3-290586

[51] Int. Cl.⁶ .................................. B60K 31/00
[52] U.S. Cl. .......................... 364/424.1; 73/866; 477/45; 477/49; 477/908; 477/161; 477/109; 477/122; 477/154; 192/48.6; 192/48.92; 192/103 C; 475/120; 74/335; 74/336 R
[58] Field of Search ................... 364/424.1, 424.01; 477/120, 124, 45, 49, 98, 161, 151, 154, 155, 908, 109, 122, 123, 152, 904; 192/48.6, 48.92, 103 C; 74/335, 336 R; 475/120; 73/866

[56] References Cited

U.S. PATENT DOCUMENTS

| | | | |
|---|---|---|---|
| 3,956,947 | 5/1976 | Leising et al. | 74/866 |
| 4,622,866 | 11/1986 | Ito et al. | 74/866 |
| 4,688,450 | 8/1987 | Hayashi et al. | 74/866 |
| 4,690,017 | 9/1987 | Tanaguchi et al. | 364/424.1 |
| 4,727,772 | 3/1988 | Sumiya et al. | 477/154 |
| 4,967,355 | 10/1990 | Iwatsuki et al. | 364/424.1 |
| 4,995,284 | 2/1991 | Takada et al. | 74/868 |
| 5,042,323 | 8/1991 | Murano et al. | 74/844 |
| 5,191,527 | 3/1993 | Asahara et al. | 364/424.1 |

FOREIGN PATENT DOCUMENTS

| | | |
|---|---|---|
| 61-99745 | 5/1986 | Japan . |
| 64-15560 | 1/1989 | Japan . |
| 3-177656 | 8/1991 | Japan . |
| 3-177654 | 8/1991 | Japan . |
| 3-177655 | 8/1991 | Japan . |

*Primary Examiner*—Gary Chin
*Assistant Examiner*—Jacques H. Louis-Jacques
*Attorney, Agent, or Firm*—Oliff & Berridge

[57] ABSTRACT

An automatic transmission of a vehicle including a speed change gear mechanism including rotary members such as gears and gear carriers and hydraulically operated friction engaging means and adapted to provide various speed stages according to selective engagement and disengagement of the friction engaging means is controlled by such steps as detecting rotation speed of at least one of the rotary members during a shifting between the speed stages, changing hydraulic pressure of at least one of the friction engaging means during a first phase of the speed stage shifting so as to make the rotation speed of the one rotary member follow a first change performance curve calculated according to a first feedback control program, and changing the hydraulic pressure of the one friction engaging means during a second phase of the speed stage shifting so as to make the rotation speed of the one rotary member follow a second change performance curve calculated according to a second feedback control program in continuity to the first change performance curve.

4 Claims, 3 Drawing Sheets

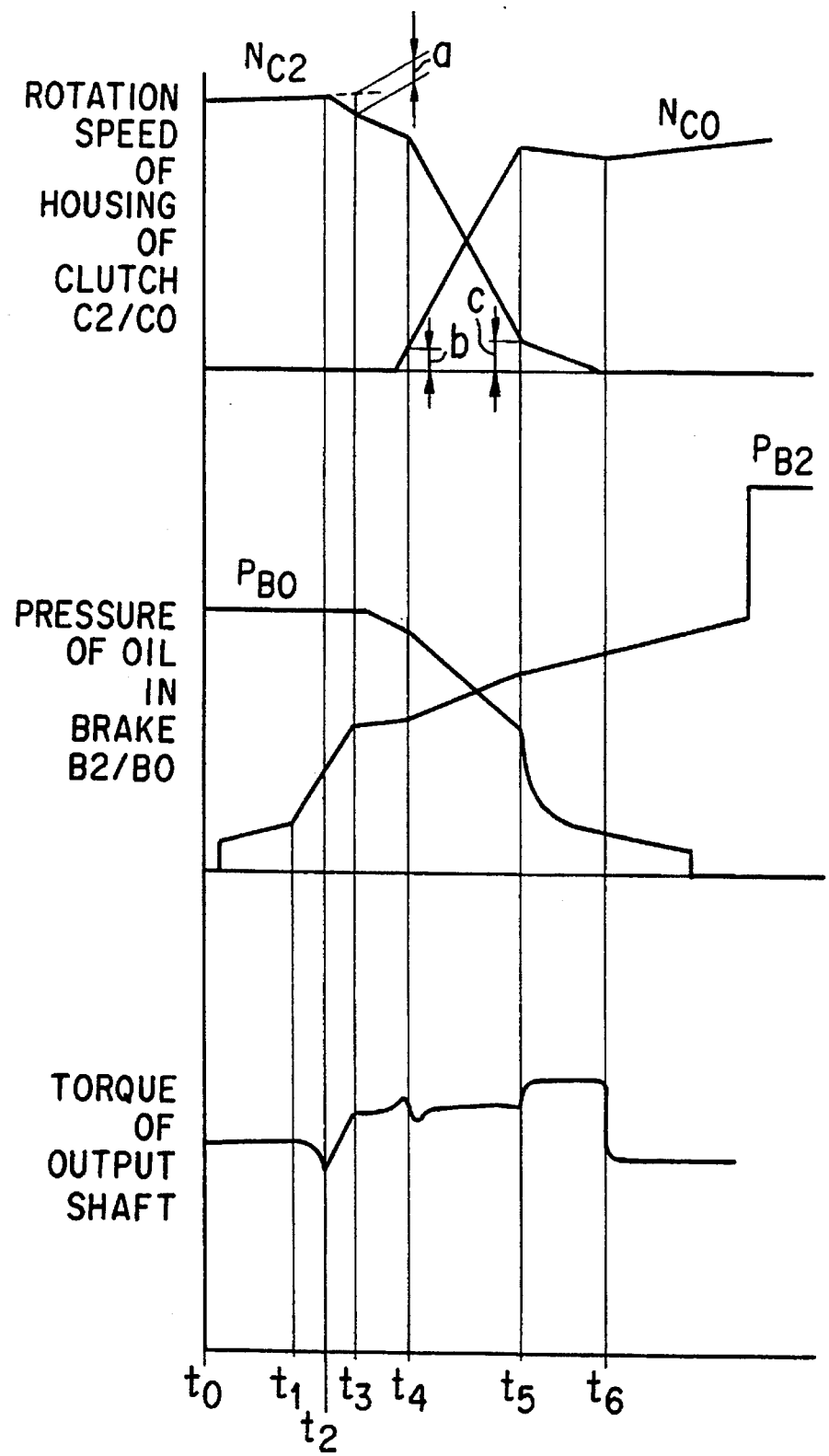
F I G. 4

SPEED STAGE SHIFTING OF AUTOMATIC TRANSMISSION BY COMPOSITE CONTROL PHASES EMPLOYING COMMON TARGET PARAMETER

This is a Continuation of application Ser. No. 07/948,415 filed Sep. 22, 1992, now abandoned.

BACKGROUND OF THE INVENTION

1. Field of the Invention

The present invention relates to a control of an automatic transmission of a vehicle, and more particularly, to a speed stage shifting of an automatic transmission of a vehicle which is carried out by a change-over of engagement and disengagement of friction engaging means.

2. Description of the Prior Art

In an automatic transmission constructed as a tandem combination of a first gear unit including a first planetary gear mechanism and friction engaging means for changing over the speed change gear ratios thereof and a second gear unit including a second or a second and a third planetary gear unit and friction engaging means for changing over the speed change gear ratios thereof, so as to provide an overall speed change gear ratio by the multiplication of the speed change gear ratio of the first gear unit and that of the second gear unit, when the speed stage of the transmission is changed over in such a manner that the first and second gear units are shifted in opposite directions so that the first gear unit is shifted down whereas the second gear unit is shifted up, or vice versa, if the timing of the switching-over of the gear ratio of the first gear unit is not properly coordinated with that of the second gear unit, there would occur a steep change of the overall transmission gear ratio during the speed stage shifting, thereby generating a very uncomfortable speed stage shift shock in the vehicle. In more detail, when, for example, the first gear unit is shifted down by the disengagement of a first friction engaging means, while the second gear unit is shifted up by the engagement of a second friction engaging means, so as thereby to decrease the overall reduction gear ratio of the transmission, i.e. to shift up the transmission, if the downshifting of the first gear unit by the disengagement of the first friction engaging means starts virtually earlier than the upshifting of the second gear unit by the engagement of the second friction engaging means when the first and second gear units are instructed at the same time to start the respective shiftings, at an initial phase of the upshifting, the transmission gear ratio increases, contrary to an upshifting operation of the transmission. In order to solve this problem, it has been proposed in Japanese Patent Laid-open Publication 61-99745 to first start only the second friction engaging means of the second gear unit, and upon the detection of a virtual upshifting of the second gear unit, to instruct the downshifting of the first gear unit.

Further, also during the parallel progress of the upshifting of the second gear unit and the downshifting of the first gear unit, if the downshifting of the first gear unit advances relative to the upshifting of the second gear unit, there would also occur an undue shifting of the overall gear ratio toward the low gear side, thereby also deteriorating driving comfortableness of the vehicle. In view of this problem, it has been proposed in Japanese Patent Laid-open Publication 64-15560 to control the hydraulic pressure of either or both of the first and second friction engaging means by the art of feedback control so that the exhausting of the hydraulic pressure from the first friction engaging means is completed at the same time as the supply of the hydraulic pressure to the second friction engaging means. In this prior art, at an initial phase of the upshifting, the upshifting of the second friction engaging means is carried out alone by the feedback control so as to control the rate of progress of the upshifting of the second gear unit with a reference target value concerned with the second gear unit, and after the start of the downshift feedback control of the first gear unit, the feedback control of the second gear unit is only continued, so that two feedback controls are carried out in parallel.

However, the performance of the feedback control of the transmission at the phase where only the second gear unit is shifted up is largely different from that of the feedback control of the transmission at the phase where the second gear unit is shifted up while the first gear unit is shifted down, due to a change of the mechanical properties of the transmission. In this case, it is difficult to optimize the performance of the feedback control of the second gear unit throughout said first and second phases of the shifting.

SUMMARY OF THE INVENTION

In view of the above-mentioned problems in the speed stage shifting of an automatic transmission of the type comprising a tandem combination of first and second gear units individually changed over for upshifting or downshifting, it is the object of the present invention to provide an improved method of controlling an automatic transmission of the above-mentioned type or any other type in general, which is more efficiently adapted, on the real time basis, to changes of the mechanical properties of the transmission during speed stage shiftings thereof.

According to the present invention, the above-mentioned object is accomplished by a method of controlling an automatic transmission of a vehicle, said transmission comprising a speed change gear mechanism including rotary members such as gears and gear carriers and hydraulically operated friction engaging means and adapted to provide various speed stages according to selective engagement and disengagement of said friction engaging means, comprising the steps of:

detecting rotation speed of at least a first one of said rotary members during a shifting between the speed stages;

changing hydraulic pressure of at least a first one of said friction engaging means during a first phase of said speed stage shifting so as to make the rotation speed of said first rotary member follow a first change performance curve calculated according to a first feedback control program; and changing the hydraulic pressure of said first friction engaging means during a second phase of said speed stage shifting so as to make the rotation speed of said first rotary member follow a second change performance curve calculated according to a second feedback control program in continuity to said first change performance curve.

In carrying out the above-mentioned method, the hydraulic pressure of said first friction engaging means may be changed at a predetermined gradual rate during an initial phase of said speed stage shifting preceding said first phase during which the hydraulic pressure of said first friction engaging means is changed according to said first feedback control program.

Further, in carrying out the above-mentioned method, hydraulic pressure of a second one of said friction engaging means may also be changed at a predetermined gradual rate during said first phase of said speed stage shifting during which the hydraulic pressure of said first friction engaging means is changed according to said first feedback control program.

In this case, rotation speed of said second rotary member may be detected during said second phase of said speed stage shifting during which the hydraulic pressure of said first friction engaging means is changed according to said first feedback control program, and the hydraulic pressure of said second friction engaging means is changed to make the rotation speed of said second rotary member follow a third change performance curve calculated according to a third feedback control program.

BRIEF DESCRIPTION OF THE DRAWINGS

In the accompanying drawings,

FIG. 4 is a diagram illustrating changes of several factors in an upshifting control carried out according to the control routine shown in FIG. 3.

DESCRIPTION OF THE PREFERRED EMBODIMENT

The present invention will now be described in more detail with respect to a preferred embodiment and in reference to the accompanying drawings.

Figure 1:
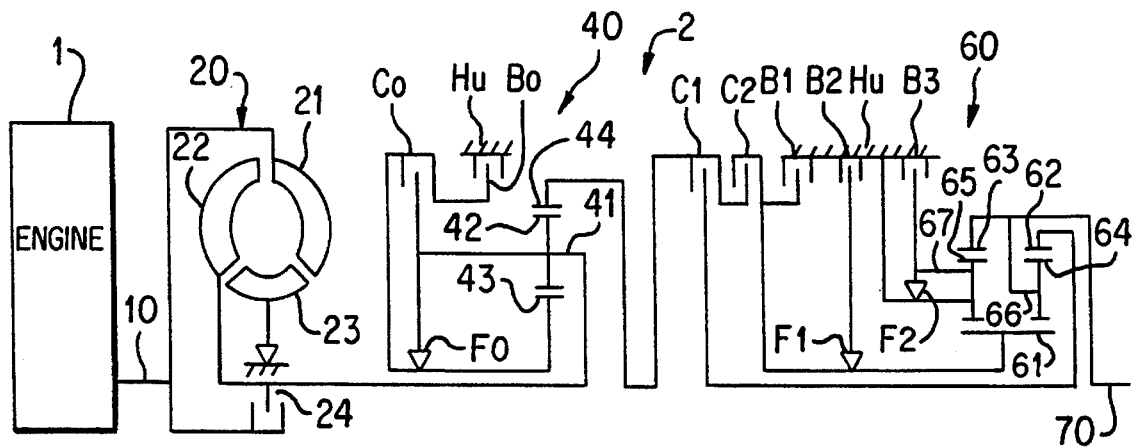
FIG. 1 is a diagrammatical illustration of a combination of an engine and an automatic transmission of a vehicle.

FIG. 1 diagrammatically illustrates a combination of an engine and an automatic transmission of a vehicle to which the speed stage shift control according to the present invention may be applied. An engine 1 is power transmittingly connected with the vehicle drive wheels (not shown in the figure) through a transmission 2 which comprises a torque converter 20, of a conventional type, having a pump 21 connected with the engine 1 via an input shaft 10, a turbine 22, a stator 23 and a lock-up clutch 24 for selectively directly connecting the pump 21 with the turbine 22. The transmission 2 further comprises a first gear unit 40 including a planetary gear mechanism having a sun gear 43, a ring gear 44, a planetary pinion 42 and a carrier 41 connected with the turbine 22 of the torque converter 20, a clutch $C_0$ for selectively connecting the sun gear 43 with the carrier 41, a brake $B_0$ for selectively braking the sun gear 43 relative to a housing Hu and a one way clutch $F_0$ for torque transmittingly connecting the sun gear 43 with the carrier 41 in only one rotational direction. Further, the transmission 2 also comprises a second gear unit 60 including a first planetary gear mechanism having a sun gear 61, a ring gear 62, a planetary pinion 64 and a carrier 66, a second planetary gear mechanism having the sun gear 61 in common with the first planetary gear mechanism, a ring gear 63, a planetary pinion 65 and a carrier 67, a clutch $C_1$ for selectively connecting the ring gear 62 with the ring gear 44 of the first gear unit 40, a clutch $C_2$ for selectively connecting the sun gear 61 with the ring gear 44 of the first gear unit 40, a brake $B_1$ for selectively braking the sun gear 61 relative to the housing Hu, a series combination of a brake $B_2$ and a one way clutch $F_1$ for selectively braking the sun gear 61 in only one rotational direction when the brake $B_2$ is engaged, a brake $B_3$ for selectively braking the carrier 67 relative to the housing Hu, and a one way clutch $F_2$ for braking the carrier 67 relative to the housing Hu in only one rotational direction, wherein the carrier 66 and the ring gear 63 are connected with one another and with an output shaft 70 of the transmission.

Figure 2:
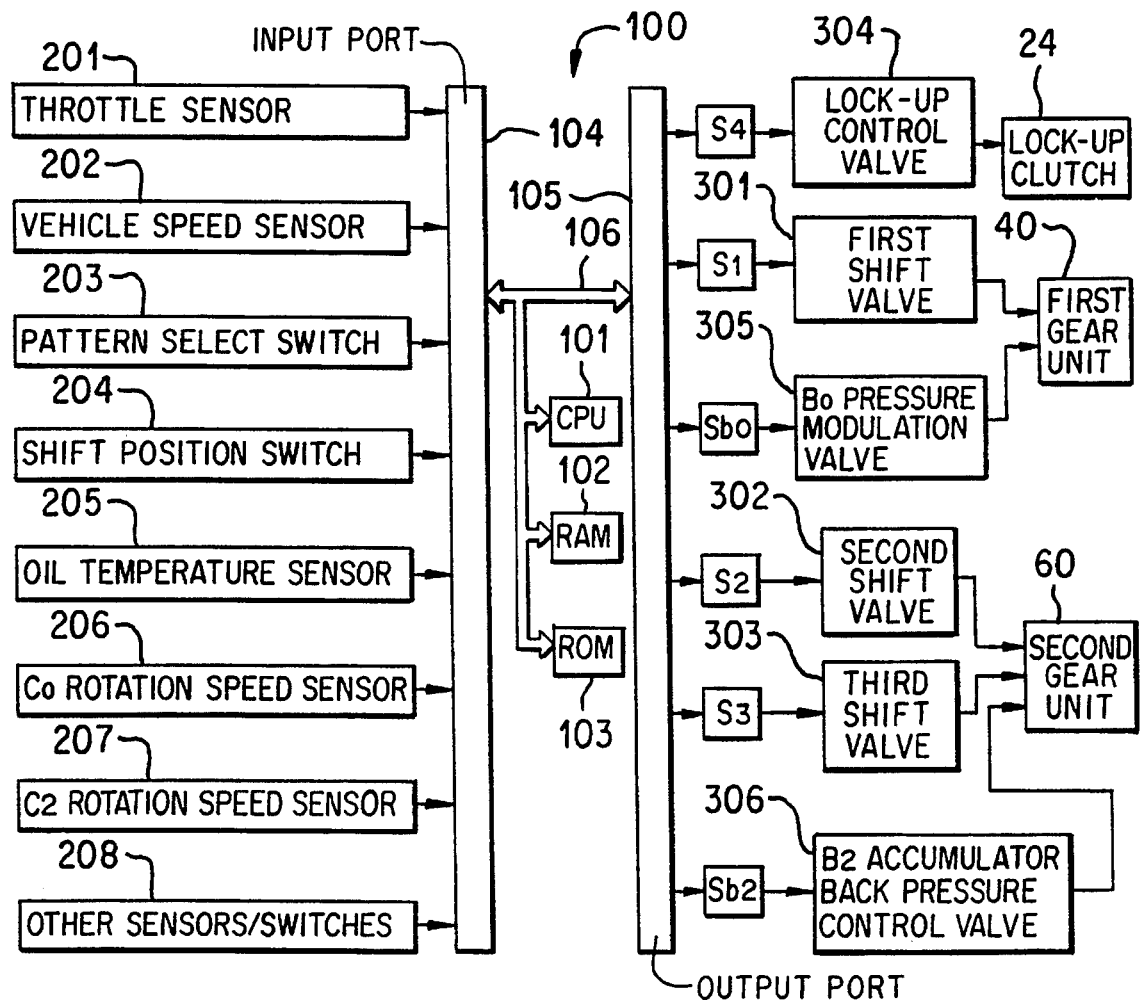
FIG. 2 is a diagrammatical illustration of a control system for changing over the gear train shown in FIG. 1 for various speed stages with a simultaneous modification of engine output torque according to the present invention.

The clutches $C_0$, $C_1$ and $C_2$ and the brakes $B_0$, $B_1$, $B_2$ and $B_3$ may be hydraulically operated to be engaged or disengaged by an electro-hydraulic control system, the general concept of which is well known in the art, in such a manner that solenoid-operated change-over valves change over supply and exhaust of hydraulic pressure to and from the respective clutches and brakes under the control of an electronic control unit. FIG. 2 shows such an electro-hydraulic control system in a diagrammatical illustration with respect to some components thereof relevant to the description of the present invention, wherein certain components are more relevant to the present invention as described hereinunder.

The tandem connection of the first gear unit 40 and the second gear unit 60 may be controlled according to the conventional method to provide four forward speed stages by the second gear unit 60 being changed over between three different gear ratios while the first gear unit 40 is maintained in its lower gear stage to provide 1st, 2nd and 3rd speed stages, and then to provide 4th speed stage as an overdrive stage by changing over the first gear unit 40 to its higher gear stage while maintaining the second gear unit 60 at the 3rd speed stage. (Of course a reverse stage is also provided, as is well known in the art.) Alternatively, the tandem connection, shown in FIG. 1, of the first gear unit 40 and the second gear unit 60 may be controlled by the electro-hydraulic control unit shown in FIG. 2 so as to provide six forward speed stages by on and off combinations of the clutches $C_0$–$C_2$, the brakes $B_0$–$B_3$ and the one way clutches $F_1$–$F_2$ as shown in Table 1:

TABLE 1

| Range | Speed | C0 | B0 | C1 | C2 | B1 | B2 | B3 | F0 | F1 | F2 |
|-------|-------|----|----|----|----|----|----|----|----|----|----|
| R     | —     | o  |    |    | o  |    |    | o  | o  |    |    |
| D     | 1st   | o  |    | o  |    |    |    |    | o  |    | o  |
| D     | 2nd   |    | o  | o  |    |    |    |    |    |    | o  |
| D     | 3rd   | o  |    | o  |    |    | o  |    | o  | o  |    |
| D     | 4th   |    | o  | o  |    |    | o  |    |    | o  |    |
| D     | 5th   | o  |    | o  | o  |    | o  |    | o  |    |    |
| D     | 6th   |    | o  | o  | o  |    | o  |    |    |    |    |
| 2     | 1st   | o  |    | o  |    |    |    |    | o  |    | o  |
| 2     | 2nd   |    | o  | o  |    |    | o  |    |    |    | o  |
| L     | 1st   | o  |    | o  |    |    | o  | o  | o  |    |    |

In the above table, "o" indicates that the clutch, brake or one way clutch is engaged at the corresponding speed stage under the corresponding shift range. In an embodiment of the tandem combination of the first gear unit 40 and the second gear unit 60, the reduction gear ratios of 1st, 2nd, 3rd, 4th, 5th and 6th speed stages are 2.804, 1.977, 1.532, 1.080, 1.000 and 0.705, respectively.

As is reflected in the above table, the first gear unit 40 is changed over from the lower gear stage, having a larger reduction gear ratio, to the higher gear stage, having a smaller reduction gear ratio, during upshifting from 1st to 2nd speed stage, from 3rd to 4th speed stage, and from 5th to 6th speed stage. Conversely, it is changed over from the higher gear stage to the lower gear stage during upshifting from 2nd to 3rd speed stage, and from 4th to 5th speed stage. During downshiftings from the 6th speed stage to the 1st speed stage, through the intermediate speed stages, the clutches and the brakes are of course engaged or disengaged in a manner reverse to those during upshiftings. So, for example, during downshifting from the 6th speed stage to the 5th speed stage, the brake $B_0$, which has been engaged, is gradually disengaged, and the clutch $C_0$, which has been disengaged, is gradually engaged. In this case, however, since the one way clutch $F_0$ is provided in parallel with the clutch $C_0$, the rate of changing over of the gear stage from the 6th speed stage to the 5th speed stage, on a time basis, may be substantially controlled by the rate of disengaging the brake $B_0$ so that, as the brake $B_0$ is gradually disengaged, the sun gear 43 is allowed to start and then to increase its speed of rotation until it catches the rotation speed of the carrier 41, whereupon the one way clutch $F_0$ is automatically engaged to produce the 5th speed stage. Thereafter the clutch $C_0$ is engaged so as to complete the direct connection between the input and output members of the first gear unit 40 for both engine driving and engine braking. Similarly, during downshifting from the 4th speed stage to the 3rd speed stage, or during upshifting from the 2nd speed stage to the 3rd speed stage, the rate of changing-over of the engagement of the brake $B_0$ to the engagement of the clutch $C_0$ may be controlled only by the control of the rate of disengagement of the brake $B_y$.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components The electronic control unit 100 is supplied with various data, through the input port means 104, such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as R, N, D, 2 and L set by a manual lever from a shift position switch 204, oil temperature from an oil temperature sensor 205, rotation speed of an outer drum of the clutch $C_0$ from a $C_0$ rotation speed sensor 206, rotation speed of an outer drum of the clutch $C_2$ from a $C_2$ rotation speed sensor 207, and other data from other sensors and/or switches or the like generally designated by 208.

In the electronic control unit 100, the CPU 101 conducts predetermined calculations including those described in detail hereinunder particularly according to the present invention based upon the data received from the sensors and/or switches and the programs stored in the ROM 103 in cooperation of the RAM 102, and outputs control signals to a hydraulic control means including various standard components not shown in the figure and particularly the following components:

$S_1$ is a solenoid valve which controls, according to on and off thereof, change-over of a first shift valve 301 which in turn controls the supply and exhaust of oil pressure to and from the clutch $C_0$ and the brake $B_0$ of the first gear unit 40.

$S_2$ and $S_3$ are solenoid valves which control, according to on and off thereof, change-over of a second shift valve 302 and a third shift valve 303, respectively, which in turn control the supply and exhaust of oil pressure to and from the clutches $C_1$ and $C_2$ and the brakes $B_1$, $B_2$ and $B_3$ of the second gear unit 60.

$S_4$ is a solenoid valve which controls, according to on and off thereof, change-over of a lock-up control valve 304 which in turn controls the supply and exhaust of oil pressure to and from the lock-up clutch 24.

$Sb_0$ is a solenoid valve which controls, according to periodical on and off thereof, an opening of a $B_0$ pressure modulation valve 305 which in turn controls the oil pressure in the brake $B_0$ so that the pressure in the brake $B_0$ is continually changed according to the duty ratio of the on and off of the solenoid valve $Sb_0$.

$Sb_2$ is a solenoid valve which controls, according to periodical on and off thereof, an opening of a $B_2$ accumulator back pressure control valve 306 which in turn controls the back pressure in an accumulator for the brake $B_2$ so that the speed of engagement or disengagement of the brake $B_2$ is continually changed according to the duty ratio of the on and off cycle of the solenoid valve $Sb_2$.

The method of speed stage shifting of the automatic transmission according to the present invention will be described with respect to an upshifting of the transmission from the 2nd speed stage to the 3rd speed stage during which, in the first gear unit 40, the brake $B_0$ is gradually disengaged, whereby an outer case, or housing, of the clutch $C_0$ starts to rotate and gradually increases its rotation speed until the one way clutch $F_0$ is finally engaged, so that the first gear unit 40 is changed over from its higher gear stage to its lower gear stage, while in the second gear unit 60 the clutch $C_1$ is kept engaged and the brake $B_2$ is now gradually engaged, whereby the sun gear 61 is gradually decelerated toward stoppage by the action of the brake $B_2$ via the one way clutch $F_1$, so that the second gear unit 60 is changed over to decrease its reduction gear ratio from its largest forward drive reduction gear ratio to the next lower forward drive reduction gear ratio. The state of deceleration, or braking, of the sun gear 61 may conveniently be detected by the rotation speed of an outer case, or housing, of the second clutch $C_2$ connected with the sun gear 61.

Figure 3:
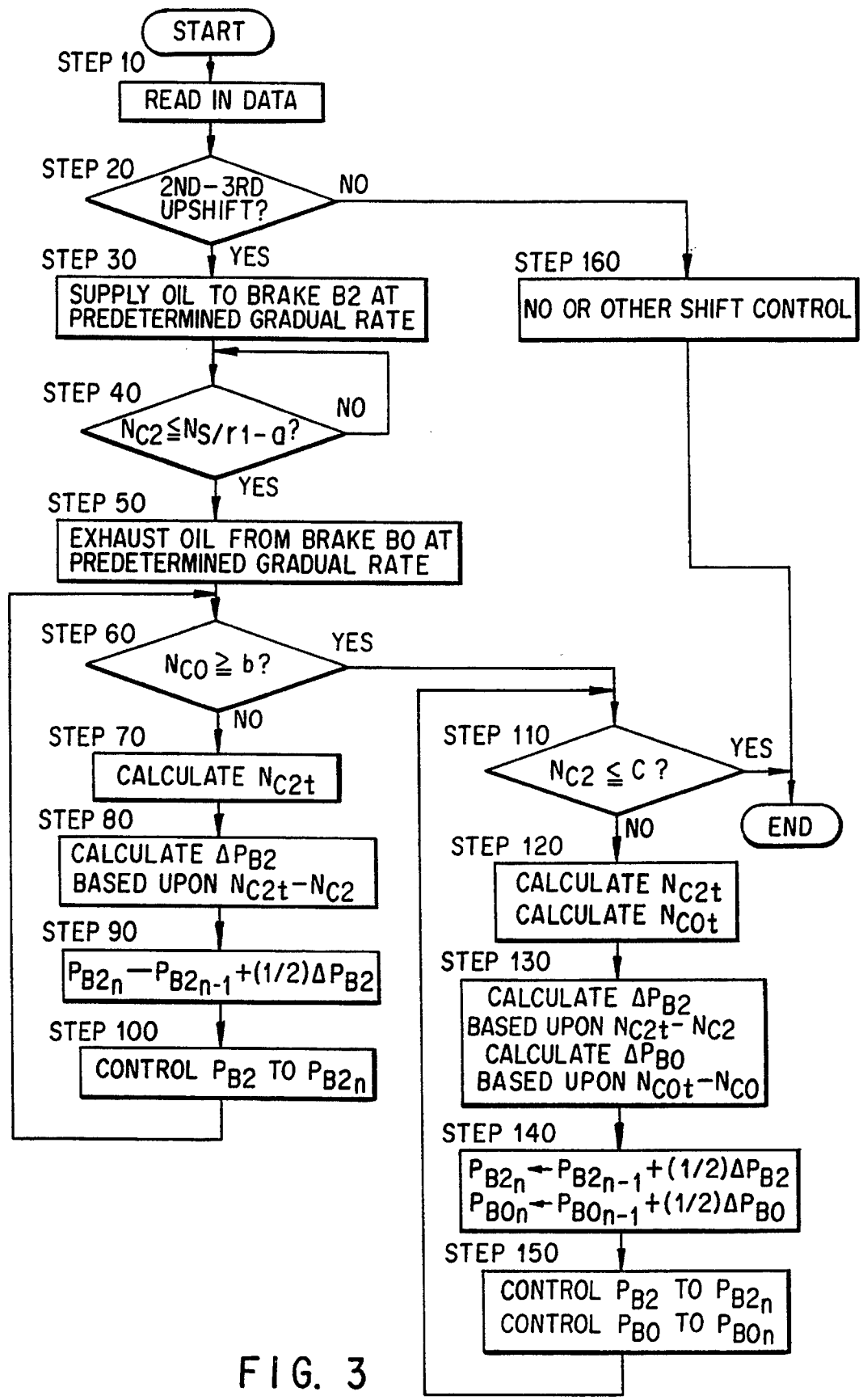
FIG. 3 is a flowchart illustrating an embodiment of the control routine carried out according to the present invention.

FIG. 3 shows an embodiment of the control process carried out by the control system shown in FIG. 2 during the upshifting of the transmission shown in FIG. 1 from the 2nd speed stage to the 3rd speed stage, and FIG. 4 is a diagram showing changes of several factors effecting the control process shown in FIG. 3.

Referring to FIG. 3, the control routine shown in the flowchart is periodically repeated at a predetermined scanning cycle, such as several microseconds. When the control is started, in step 10 data are read in from various sensors and switches (such as those shown in FIG. 2), and the control process proceeds to step 20.

In step 20, it is judged, based upon the read in data, if the upshifting from the 2nd speed stage to the 3rd speed stage, in the present example, is to be carried out. If the answer is YES, the control process proceeds to step 30 to carry out such upshifting, whereas if the answer is NO, the control process proceeds to step 160 for no shift control or other shift control.

When the upshifting from the 2nd speed stage to the 3rd speed stage is to be carried out, in step 30, supply of oil to the brake $B_2$ at a predetermined gradual rate is started, and the control process proceeds to step 40.

In step 40, it is judged if the engagement of the brake B2 has proceeded to a predetermined degree, based upon a comparison of the rotation speed $N_{C2}$ of the housing of the clutch $C_2$, which represents the rotation speed of the sun gear 61, and the rotation speed $N_s$ of the output shaft 70 of the transmission 2 detected directly or indirectly by the vehicle speed sensor 202. When the brake $B_2$ is completely disengaged, $N_{C2}$ is equal to Ns/r1, wherein r1 is a ratio of the number of teeth of the sun gear 61 to the number of teeth of the ring gear 62. Therefore, the predetermined degree of engagement of the brake B2 is judged by detecting if $N_{C2}$ is equal to or smaller than Ns/r 1–a, wherein "a" is an amount predetermined for this judging purpose. If the answer is YES, the control process proceeds to step 50, whereas if the answer is NO, the control process repeats the judging step until the answer changes to YES, i.e. until $N_{C2}$ decreases as much as "a" relative to Ns/r1.

In step 50, exhaust of oil from the brake $B_0$ at a predetermined gradual rate is started, whereby, after a certain delay of time, the housing of the clutch $C_0$ starts to rotate, and gradually increases its rotation speed as a more amount of oil is exhausted from the brake $B_0$. After the start of the exhaust of oil from the brake $B_0$, the control process proceeds to step 60.

In step 60, it is judges if the rotation speed of the housing of the clutch $C_0$, i.e. the rotation speed of the sun gear 43, has increased up to a predetermined value "b". If the answer is NO, the control process proceeds to step 70.

In step 70, a target rotation speed $N_{C2t}$ for the rotation speed of the housing of the clutch $C_2$ at each scanning moment is calculated by the CPU 101 based upon a program stored in the ROM 103 and the various data available at that time, wherein the target rotation speed $N_{C2t}$ is determined to provide an optimum upshift performance of the transmission under the existing situation. Then, in step 80, based upon the difference between the calculated target rotation speed $N_{C2t}$ and the actual rotation speed $N_{C2}$ detected by the $C_2$ rotation speed sensor 207, an amount of modification $\Delta P_{B2}$ to be effected with respect to the oil pressure of the brake $B_2$ in order to make the rotation speed of the housing of the clutch $C_2$ follow the target value therefor, is calculated. Then, the control process proceeds to step 90.

In step 90, a new due value $P_{B2n}$ of the oil pressure in the brake $B_2$ is calculated so as to modify the value thereof $P_{B2n-1}$ obtained in the scanning cycle preceding one cycle the present scanning cycle by a half of the calculated due amount for modification. By so doing, a filtering effect is obtained which removes a noise in the input data (such as a fluctuation in the rotation of the clutch housing), so that the performance of the feedback control carried out by the present control routine is not affected by such a noise.

In step 100, the oil pressure of the brake $B_2$ is controlled so as to coincide with the new due value $P_{B2n}$.

The control steps 60–100 are repeated until the rotation speed $N_{C0}$ of the housing of the clutch $C_0$ reaches the predetermined value "b". When it was judged in step 60 that $N_{C0}$ has reached the value "b", then the control process proceeds to step 110.

In step 110, it is judged if the 2nd to 3rd upshifting has been substantially completed. In the shown control routine, the substantial completion of the 2nd to 3rd upshifting is judged by detecting if $N_{C2}$ has decreased to be equal to or smaller than a predetermined amount "c", as braked by the brake $B_2$ via the one way clutch F1.

Until the substantial completion of the 2nd to 3rd upshifting, in step 120, the target rotation speed $N_{C2t}$ for the housing of the clutch $C_2$ is calculated, as virtually continued from the step 70. Further, a target rotation speed $N_{C0t}$ for the housing of the clutch $C_0$ is now also calculated, in the same manner as in the calculation of the target rotation speed for the clutch $C_2$, by the CPU 101 based upon a program stored in the ROM 103. Then, in step 130, in the same manner as in step 80, based upon the difference between the calculated target rotation speed $N_{C2t}$ and the actual rotation speed $N_{C2}$ detected by the $C_2$ rotation speed sensor 207, the amount of modification $\Delta P_{B2}$ to be effected with respect to the oil pressure of the brake $B_2$ is calculated, so as to make the rotation speed of the housing of the clutch $C_2$ follow the target value therefor. Further, also based upon the difference between the calculated target rotation speed $N_{C0t}$ and the actual rotation speed $N_{C0}$ detected by the $C_0$ rotation speed sensor 206, an amount of modification $\Delta P_{B0}$ to be effected with respect to the oil pressure of the brake $B_0$ is calculated, so as to make the rotation speed of the housing of the clutch $C_0$ follow the target value therefor.

In step 140, in the same manner as in step 90, the new due value $P_{B2n}$ of the oil pressure of the brake $B_2$ is calculated so as to modify the value thereof $P_{B2n-1}$ obtained in the scanning control cycle preceding one cycle the present scanning control cycle by a half of the calculated due amount for the modification. Further, also with respect to the brake $B_0$, a new due value $P_{B0n}$ of the oil pressure in the brake $B_0$ is calculated so as to modify the value thereof $P_{B0n-1}$ obtained in the just preceding scanning cycle by a half of the calculated due amount for the modification.

In step 150, the oil pressure of the brake $B_2$ is controlled to coincide with the new due value $P_{B2n}$, and the oil pressure of the brake $B_0$ is also controlled to coincide with the new due value $P_{B0n}$.

The changes of the rotation speeds $N_{C2}$ and $N_{C0}$ of the housings of the clutches $C_2$ and $C_0$, the oil pressures $P_{B2}$ and $P_{B0}$ of the brakes $B_2$ and $B_0$, and the torque of the output shaft of the transmission during the 2nd to 3rd upshifting controlled according to the routine shown in FIG. 3, are diagrammatically illustrated in FIG. 4.

As is reflected in FIG. 4, when the 2nd to 3rd upshifting starts at time point to, according to the judgment in step 20, due to the gradual supply of oil to the brake $B_2$ in step 30, the oil pressure $P_{B2}$ of the brake $B_2$, after a delay of time to cancel a clearance in the corresponding servo system, starts to increase substantially at a time point t1, and at a time point t2, the rotation speed $N_{C2}$ of the housing of the clutch $C_2$ starts to decrease gradually.

When $N_{C2}$ has decreased as much as "a" relative to Ns/r1, at time point 13, the first phase of feedback control of the oil pressure $P_{B2}$ of the brake $B_2$ according to the steps 60–100 is started, so as to make the rotation speed $N_{C2}$ of the housing of the clutch $C_2$ follow a calculated performance.

When the rotation speed $N_{C0}$ of the housing of the clutch $C_0$ has increased up to the predetermined value "b", at time a point 14, the second phase of feedback control of the oil pressure $P_{B2}$ of the brake $B_2$ according to the steps 110–150 is started, in continuity to the feedback control according to the steps 60–100, so as to watch the rotation speed $N_{C2}$ of the housing of the clutch $C_2$ and to make it follow a newly calculated performance curve. At the same time, now the oil pressure $P_{B0}$ of the brake $B_0$ is also controlled by the feedback control according to the steps 110–150 so as to watch the rotation speed $N_{C0}$ of the housing of the clutch $C_0$ and to make it follow a calculated performance curve. The second phase of feedback control is carried out until $N_{C2}$ decreases down to "c". Thereafter, at a time point t6, the housing of the clutch $C_2$ stops.

Thus, according to the present invention, when the transmission includes a plurality of gear units connected in a tandem arrangement and highly sensitive to the timing coordination of the controls of the respective gear units, the shift control is carried out by changing over various types of control including a gradual control generally desirable only for an initial stage of the shift control, a feedback control concerned with one of the gear units, and a mixed feedback control concerned with more than one gear units as mutually interrelated and continued from a preceding feedback control, through the overall speed stage shifting process of the combination of the first and second gear units.

According to such a combination of different types of control for the engagement of the brake $B_2$ and the disengagement of the brake $B_0$ on a real time basis, the oil pressures $P_{B2}$ and $P_{B0}$ and the rotation speeds $N_{C2}$ and $N_{C0}$ change as shown in FIG. 4, and in accordance therewith the torque of the output shaft of the transmission changes as shown in FIG. 4, wherein a particular improvement of the torque performance available by the present invention is seen during the period between 13 to 15, during which the torque would otherwise fluctuate more unstably.

Although the invention has been described in detail with respect to a preferred embodiment thereof, it will be apparent to those skilled in the art that various modifications are possible without departing from the scope of the present invention.

We claim:

1. A method of controlling an automatic transmission of a vehicle for shifting from a first speed stage of a first reduction gear ratio to a second speed stage of a second gear ratio, said transmission comprising a speed change gear mechanism including gears and gear carriers as rotary members and hydraulically operated friction engaging means and adapted to provide various speed stages including said first and second speed stages according to selective engagement and disengagement of said friction engaging means, said friction engaging means including first and second friction engaging means, and said rotary members including a first rotary member whose rotation speed reflects an engaging condition of said first friction engaging means and a second rotary member whose rotation speed reflects an engaging condition of said second friction engaging means, comprising the steps of:

detecting rotation speed of said first and second rotary members during the shifting between the speed stages;

changing hydraulic pressure of said first friction engaging means during a first phase of said speed stage shifting so as to shift a first part of said speed change gear mechanism for contribution to shifting the reduction gear ratio from said first reduction gear ratio to said second reduction gear ratio with the rotation speed of said first rotary member following a first change performance curve calculated according to a first feedback control program, while changing hydraulic pressure of said second friction engaging means so as to shift a second part of said speed change gear mechanism for partly cancelling said contribution of said first part of said speed change gear mechanism to the shifting of the reduction gear ratio from said first reduction gear ratio to said second reduction gear ratio; and changing the hydraulic pressure of said first friction engaging means during a second phase of said speed stage shifting so as to make the rotation speed of said first rotary member follow a second change performance curve calculated according to a second feedback control program in continuity to said first change performance curve, wherein switching over from said first phase to said second phase is triggered according to a detection that rotation speed of said second rotary member traversed a threshold value which reflects an engaging condition of said second friction engaging means to effect a predetermined progress of said shifting of said second part of said speed change gear mechanism.

2. The method according to claim 1, wherein the hydraulic pressure of said first friction engaging means is changed at a predetermined gradual rate during an initial phase of said speed stage shifting preceding said first phase,i the first phase being when the hydraulic pressure of said first friction engaging means is changed according to said first feedback control program.

3. The method according to claim 1, wherein hydraulic pressure of said second friction engaging means is changed at a predetermined gradual rate during said first phase of said speed stage shifting during which the hydraulic pressure of said first friction engaging means is changed according to said first feedback control program.

4. The method according to claim 3, wherein rotation speed of said second rotary member is detected during said second phase of said speed stage shifting during which the hydraulic pressure of said first friction engaging means is changed according to said second feedback control program, and the hydraulic pressure of said second friction engaging means is changed to make the rotation speed of said second rotary member follow a third change performance curve calculated according to a third feedback control program.

* * * * *